US007980082B2

(12) United States Patent
Ziminsky et al.

(10) Patent No.: US 7,980,082 B2
(45) Date of Patent: Jul. 19, 2011

(54) WOBBE CONTROL AND ENHANCED OPERABILITY THROUGH IN-LINE FUEL REFORMING

(75) Inventors: Willy S. Ziminsky, Simpsonville, SC (US); Gilbert O. Kraemer, Greer, SC (US); Girard A. Simons, Anderson, SC (US); Mark A. Hadley, Greer, SC (US)

(73) Assignee: General Electric Company, Schenectady, NY (US)

( * ) Notice: Subject to any disclaimer, the term of this patent is extended or adjusted under 35 U.S.C. 154(b) by 998 days.

(21) Appl. No.: 11/882,376

(22) Filed: Aug. 1, 2007

(65) Prior Publication Data
US 2009/0031731 A1 Feb. 5, 2009

(51) Int. Cl.
*F02C 6/18* (2006.01)
(52) U.S. Cl. .......................................................... 60/780
(58) Field of Classification Search ................. 60/39.12, 60/723, 777, 780
See application file for complete search history.

(56) References Cited

U.S. PATENT DOCUMENTS

| | | | |
|---|---|---|---|
| 3,940,923 A * | 3/1976 | Pfefferle .......................... 60/777 |
| 5,987,878 A * | 11/1999 | Koyama et al. ............... 60/39.12 |
| 6,082,092 A | 7/2000 | Vandervort |
| 6,502,402 B1 | 1/2003 | Smith et al. |
| 6,510,695 B1 * | 1/2003 | Fisher ............................. 60/780 |
| 6,752,623 B2 * | 6/2004 | Smith et al. .................... 431/170 |
| 7,181,916 B2 | 2/2007 | Ziminsky et al. |
| 7,185,494 B2 | 3/2007 | Ziminsky et al. |
| 7,395,670 B1 * | 7/2008 | Drnevich et al. .............. 60/780 |
| 2002/0077512 A1 * | 6/2002 | Tendick et al. ............... 568/959 |
| 2005/0019620 A1 * | 1/2005 | Schick et al. .................. 429/12 |
| 2007/0119178 A1 * | 5/2007 | Berenbrink et al. ........... 60/773 |
| 2009/0120054 A1 * | 5/2009 | Prade ............................. 60/39.3 |

OTHER PUBLICATIONS

Pickenacker et al., D. Trimis, "Excess Air Controlled Operation of Boilers and Furnaces by Means of Wobbe Number Measurement," *5th European Conference on Industrial Furnaces and Boilers (INFUB5): Session Burners, Combustion and Basic Heat Transfer*, vol. I, Espinho-Porto/Portugal, Apr. 11-14, 2000.

* cited by examiner

*Primary Examiner* — Michael Cuff
*Assistant Examiner* — Phutthiwat Wongwian
(74) *Attorney, Agent, or Firm* — Nixon & Vanderhye, PC

(57) ABSTRACT

A method of regulating the Wobbe number of a multi-composition gas fuel supplied to one or more combustors of a gas turbine comprising: (a) providing a control system for regulating fuel and air flow to the one or more combustors; and (b) reforming a fraction of the gas fuel upstream of the one or more combustors to form hydrogen and carbon monoxide to be supplied to the one or more combustors with a remaining fraction of the fuel; wherein the fraction of fuel reformed is adjusted to maintain the Wobbe number of the fuel supplied to the one or more combustors within a predetermined range.

3 Claims, 1 Drawing Sheet

WOBBE CONTROL AND ENHANCED OPERABILITY THROUGH IN-LINE FUEL REFORMING

BACKGROUND OF THE INVENTION

This invention relates generally to gas turbine engine combustion systems, and more particularly, to methods and apparatus for controlling the operation of the combustion systems.

Gas turbine engines typically include a compressor section, a combustor section, and at least one turbine section. The compressor discharge air is channeled into the combustor where fuel is injected, mixed and burned. The combustion gases are then channeled to the turbine which extracts energy from the combustion gases.

Gas turbine engine combustion systems must operate over a wide range of flow, pressure temperature and fuel/air ratio operating conditions. Controlling combustor performance is required to achieve and maintain satisfactory overall gas turbine engine operation and to achieve acceptable emissions levels, the main concern being NOx and CO levels.

One class of gas turbine combustors achieve low NOx emissions levels by employing lean premixed combustion wherein the fuel and an excess of air that is required to burn all the fuel are mixed prior to combustion to control and limit thermal $NO_x$ production. This class of combustors, often referred to as Dry Low NOx (DLN) combustors are usually limited by pressure oscillations known as "dynamics" in regards to their ability to accommodate different fuels. This is due to the change in pressure ratio of the injection system that results from changes in the volumetric fuel flow required. This constraint is captured by the Modified Wobbe Index; i.e., the combustion system will have a design Wobbe number for optimum dynamics. The Modified Wobbe Index (MWI) is proportional to the lower heating value in units of BTU/scf and inversely proportional to the square root of the product of the specific gravity of the fuel relative to air and the fuel temperature in degrees Rankine.

This problem as so far been addressed by restricting changes in Wobbe number or by adjusting the fuel temperature to recenter the Wobbe number of a given fuel. Fuel split changes to the combustor (e.g., retuning) are also possible, but they may impact emissions.

Such systems often require multiple independently controlled fuel injection points or fuel nozzles in each of one or more substantially parallel and identical combustors to allow gas turbine operation from start-up through full load. Furthermore, such DLN combustion systems often function well only over a relatively narrow range of fuel injector pressure ratios. The pressure ratio is a function of fuel flow rate, fuel passage flow area and gas turbine cycle pressures before and after the fuel nozzles. Such pressure ratio limits are managed by selection of the correct fuel nozzle passage areas and regulation of the fuel flows to the several fuel nozzle groups. The correct fuel nozzle passage areas are based on the actual fuel properties which are nominally assumed to be contact.

Historically, pipeline natural gas composition in general, and specifically its Modified Wobbe Index, have varied only slightly. Fuel nozzle gas areas are sized for a limited range of fuel MWI, typically less than about plus or minus five percent of the design value, and for a gas turbine with Dry Low NOx combustion systems with multiple fuel injection points, the gas turbine combustion system is set up with fuel distribution schedules such that the fuel splits among the various injection points vary with machine operating conditions. For some DLN combustion systems, if fuel properties change by a value of more than about plus or minus two percent in MWI, it is necessary to make fuel schedule adjustments while monitoring both emissions and combustion dynamics levels. Such fuel schedule adjustment is called "tuning", a process that requires technicians to set up special instrumentation, and that may take a day or longer to accomplish. Furthermore, when the fuel supplied to a specific gas turbine installation is from more than one source (with different compositions and resulting MWI), it has been necessary to "retune" the fuel split schedules (and, prior to the invention disclosed herein) repeat for every fuel supply switch. Furthermore, any blend of the two or more fuels is the equivalent of another fuel composition and as a result, a variable blend of the fuels that exceeds the MWI range of the combustor design could not be tolerated prior to this invention without operational adjustments to the gas turbine and/or gas turbine combustor (e.g. variable fuel temperature). Gas turbine engine efficiency can be improved by employing an available source of heat such as low energy steam or water to preheat the fuel gas entering the gas turbine combustor. For gas turbines employing heated gas, load up time may depend on the time required to generate hot water in the initially cool heat recovery steam generator to heat the fuel gas to a minimum required level. Until the fuel gas reaches the required temperature and consequently the required MWI, some combustor designs are unable to operate in the low $NO_x$ combustion mode. If the minimum acceptable gas temperature level can be reduced, which corresponds to raising the maximum permissible MWI value, gas turbine operations are improved and total emissions reduced by shortened load up times.

Operation outside of the design MWI range can for some of DLN combustion system designs result in combustion dynamics levels (noise due to oscillatory combustion process) that are large enough to shorten the maintenance intervals or even cause hardware damage and forced outages. It is desirable therefore to permit a larger variation in gas fuel composition, temperature and resulting MWI, while maintaining low emissions and combustion dynamics levels within predetermined limits.

BRIEF DESCRIPTION OF THE INVENTION

In one non-limiting exemplary embodiment, a gas turbine engine is coupled by a drive shaft to an electrical generator as the principle gas turbine load. In this embodiment, the gas turbine engine includes at least one combustor that includes a plurality of fuel injection nozzles configured to inject fuel into the combustor(s) at a plurality of different locations in each combustor, and wherein the different injection nozzles are supplied by fuel from more than one gas flow control valve. The gas turbine engine includes a control system including a plurality of sensors positioned about the gas turbine engine and configured to measure flow, pressure, temperature or other parameters to establish engine operating state, a processor programmed to receive the aforementioned parameters, plus a signal indicative of the MWI of the fuel. In a gas turbine, the Wobbe number of the fuel can be manipulated by partial oxidation of a portion of the fuel through an inline reformer. The net effect is "air doping" plus the conversion of a portion of the fuel to hydrogen and carbon monoxide. Additionally, the hydrogen and carbon monoxide can be leveraged to increase the stability of the combustor for lower emissions/increased turndown. Accordingly, in accordance with one exemplary and non-limiting embodiment, this invention employs a system in which a catalytic module is added to the fuel line of one or more of the combustor fuel circuits to partially reform a small percentage of the fuel. The change in species, as well as the addition of air and the heat release, combine to adjust the Wobbe number of the fuel. The advantages provided by this invention include wide Wobbe operation, in that the "air doping/partial reforming" allows the system to recenter the Wobbe number despite changes in fuel composition. Additionally, the availability of hydrogen due to the partial reforming, allows for increased stability/turndown enabling lower emissions as well as emissions compliant operation at lower load.

Accordingly, in one aspect, the invention relates to a gas turbine engine system comprising a compressor, a plurality of combustors, and a turbine wherein a control system including a fuel controller regulates fuel and compressor air input to each combustor and wherein an in-line fuel reformer is located upstream of one or more of the plurality of combustors to reform a fraction of the fuel supplied to the one or more combustors.

In another aspect, the invention relates to a method of regulating the Wobbe number of a multi-composition gas fuel supplied to one or more combustors of a gas turbine comprising: (a) providing a control system for regulating fuel and air flow to the one or more combustors; and (b) reforming a fraction of the gas fuel upstream of the one or more combustors to form hydrogen and carbon monoxide to be supplied to the one or more combustors with a remaining fraction of the fuel; wherein the fraction of fuel reformed is adjusted to maintain the Wobbe number of the fuel supplied to the one or more combustors within a predetermined range.

The invention will now be described in connection with the drawings identified below.

DETAILED DESCRIPTION OF THE INVENTION

Figure 1:
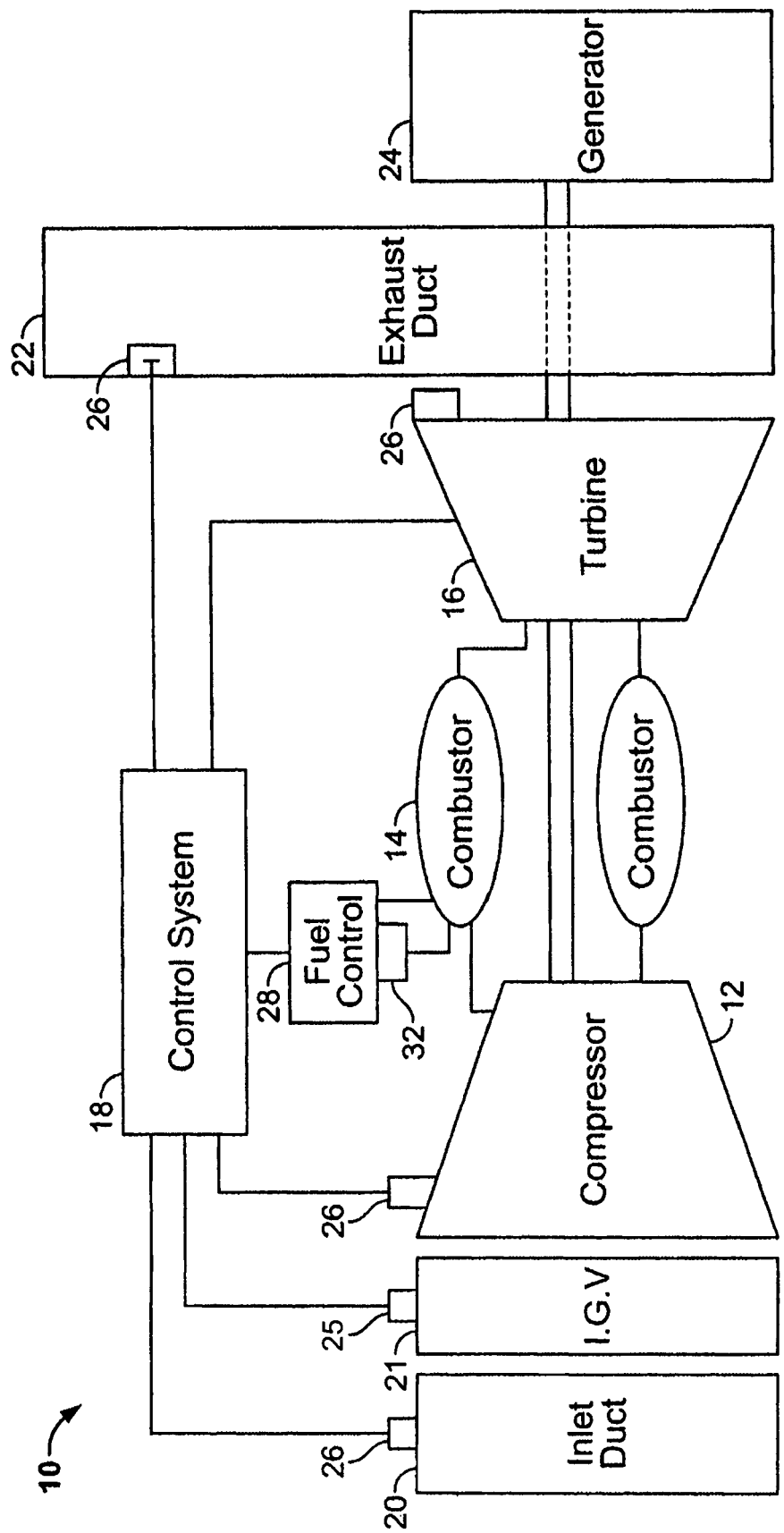
FIG. 1 is a schematic diagram of a gas turbine engine system.

FIG. 1 is a schematic diagram of a gas turbine engine system 10 including a compressor 12, a combustor 14, a turbine 16 coupled by a drive shaft 15 to the compressor 12. The gas turbine engine is managed by a combination of operator commands and a control system 18. An inlet duct system 20 channels ambient air to the compressor inlet guide vanes 21 which, by modulation with actuator 25, regulates amount of air to compressor 12. An exhaust system 22 channels combustion gases from the outlet of turbine 16 through, for example, sound absorbing, heat recovery and possibly other emissions control devices. Turbine 16 may drive a generator 24 that produces electrical power or any other type of mechanical load.

The operation of the gas turbine engine system 10 may be monitored by a variety of sensors 26 detecting various conditions of the compressor 12, turbine 16, generator 24 and ambient environment. For example, sensors 26 may monitor ambient temperature, pressure and humidity surrounding gas turbine engine system 10, compressor discharge pressure and temperature, turbine exhaust gas temperature, and other pressure and temperature measurements within the gas turbine engine. Sensors 26 may also comprise flow sensors, speed sensors, flame detector sensors, valve position sensors, guide vane angle sensors, and other sensors that sense various parameters relative to the operation of gas turbine engine system 10. As used herein, "parameters" refer to physical properties whose values can be used to define the operating conditions of gas turbine engine system 10, such as temperatures, pressures, and fluid flows at defined locations, etc.

In addition to the above-mentioned sensors 26 there are one or more sensors 34 to monitor or measure fuel properties sufficient to determine fuel MWI prior to or after the inline fuel reformer described below. The determination of a parameter representative of the fuel MWI (such as only fuel temperature) for fixed fuel properties is a requirement in order to employ the subject invention.

A fuel controller 28 responds to commands from the control system 18 to continuously regulate the fuel flowing from a fuel supply to the combustor(s) 14, and the fuel splits to multiple fuel nozzle injectors located within each of the combustor(s) 14. Fuel control system 28 may also be directed by the controller 18 to select the type of fuel or a mix of fuels for the combustor if more than one fuel is available. By modulating fuel splits among the several fuel gas control valves, emissions and dynamics are optimized over the machine load range. Fuel split modulation depends primarily on a calculated parameter, called combustion reference temperature, which is a function of machine exhaust temperature, compressor discharge pressure and other continuously monitored machine parameters.

The control system 18 may be a computer system having a processor(s) that executes programs to control the operation of the gas turbine using the sensor inputs described above and instructions from human operators. The programs executed by the control system 18 may include scheduling algorithms for regulating fuel flow and fuel splits to combustor(s) 14. More specifically, the commands generated by the control system cause actuators in the fuel controller 28 to regulate the flow and fuel splits and type of fuel flowing to the combustors; adjust inlet guide vanes 21 on the compressor, and activate other control settings on the gas turbine.

The algorithms thus enable control system 18 to maintain the combustor firing temperature and exhaust temperature to within predefined temperature limits and to maintain the turbine exhaust NOx and CO emissions to below predefined limits at part-load through full load gas turbine operating conditions. The combustors 14 may be a DLN combustion system, and the control system 18 may be programmed and modified to control the fuel splits for the DLN combustion system according to the predetermined fuel split schedules, modified by a tuning process which occurs after every major combustor and gas turbine maintenance outages to optimize emissions and combustion dynamics. Combustor fuel splits are also set by the periodic tuning process to satisfy performance objectives while complying with operability boundaries of the gas turbine. All such control functions have a goal to optimize operability, reliability, and availability of the gas turbine.

The catalytic module 32 is added to the fuel line of one or more of the combustor fuel circuits (see FIG. 1) to partially reform, i.e., partially oxidize, a small percentage of the fuel to form hydrogen and carbon monoxide which are added to the remaining fraction of non-reformed fuel. The change in species, as well as the addition of air and the heat release, combine to adjust the Wobbe number of the fuel. In addition, the amount of reforming can be adjusted to maintain the Wobbe number within a predetermined range, and to increase stability at low load, or enable lower emissions due to the effects of H2 on lean premixed combustion.

The above-described methods and apparatus provide a cost-effective and reliable means for automatically and continuously modulating gas fuel properties to permit a relatively large variation in the fuel composition. More specifically, the methods facilitate operation with a relatively large variation in fuels for heavy duty combustion gas turbines fitted with low NOx emissions combustion systems. As a result, the methods and apparatus described herein facilitate gas turbine engine operation in a cost-effective and reliable manner.

A technical effect of the method and apparatus is to provide a system that automatically and continuously modulates gas fuel properties via partial oxidation of a fraction of the main fuel flow to permit a relatively large variation in the fuel composition for use in the gas turbine engine.

While the methods and apparatus are herein described in the context of a gas turbine engine used in an electric power generation or industrial environment, it is contemplated that the method and apparatus described herein may find utility in other gas turbine systems applications employing gas fueled combustors. In addition, the principles and teachings set forth herein are applicable to gas turbine engines using a variety of combustible gas fuels such as, but not limited to, natural gas, LPG (Liquefied Petroleum Gas), LNG (liquefied natural gas), industrial process tail gas and other synthetic gases. The description herein below is therefore set forth only by way of illustration, rather than limitation.

While the invention has been described in terms of various specific embodiments, those skilled in the art will recognize that the invention can be practiced with modification within the spirit and scope of the claims.

What is claimed is:

1. A gas turbine engine system comprising a compressor, a plurality of combustors, and a turbine wherein a control system including a fuel controller regulates fuel and compressor air input to each combustor and one or more sensors wherein an in-line fuel reformer is located upstream of one or more of said plurality of combustors to reform a fraction of the fuel supplied to said one or more combustors, wherein said in-line fuel reformer comprises a catalytic module, and wherein said control system regulates the fraction of fuel reformed in said catalytic module to maintain the Wobbe number for the fuel within a predetermined range.

2. The gas turbine engine system of claim 1 wherein said catalytic module is located downstream of said control system and said fuel controller.

3. The gas turbine system of claim 1 wherein fuel supplied to the system comprises multi-sourced fuels of different compositions, said in-line reformer including means for oxidizing said fraction of fuel supplied to said one or more combustors to form hydrogen and carbon monoxide.

* * * * *